US008428022B2

(12) United States Patent
Frank et al.

(10) Patent No.: US 8,428,022 B2
(45) Date of Patent: Apr. 23, 2013

(54) METHOD AND APPARATUS FOR TRANSMITTING POSITIONING REFERENCE SIGNALS IN A WIRELESS COMMUNICATION NETWORK

(75) Inventors: Colin Frank, Park Ridge, IL (US); Sandeep Krishnamurthy, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 412 days.

(21) Appl. No.: 12/870,148

(22) Filed: Aug. 27, 2010

(65) Prior Publication Data

US 2012/0051445 A1    Mar. 1, 2012

(51) Int. Cl.
    *H04W 4/00*    (2009.01)
(52) U.S. Cl.
    USPC ........................................ 370/329; 455/456.1
(58) Field of Classification Search .................. 370/310, 370/329; 455/456.1
    See application file for complete search history.

(56) References Cited

U.S. PATENT DOCUMENTS

| 4,631,543 | A  | 12/1986 | Brodeur |
| 7,639,660 | B2 | 12/2009 | Kim et al. |
| 7,940,740 | B2 | 5/2011  | Krishnamurthy et al. |
| 2001/0034238 | A1 | 10/2001 | Voyer |
| 2003/0222819 | A1 | 12/2003 | Karr et al. |
| 2005/0134456 | A1 | 6/2005  | Niu et al. |
| 2005/0135324 | A1 | 6/2005  | Kim et al. |
| 2006/0019677 | A1 | 1/2006  | Teague et al. |
| 2006/0209754 | A1 | 9/2006  | Ji et al. |
| 2006/0256887 | A1 | 11/2006 | Kwon et al. |
| 2006/0291393 | A1 | 12/2006 | Teague et al. |
| 2007/0008108 | A1 | 1/2007  | Schurig et al. |
| 2007/0049280 | A1 | 3/2007  | Sambhwani et al. |
| 2007/0133462 | A1 | 6/2007  | Guey |
| 2007/0153743 | A1 | 7/2007  | Mukkavilli et al. |
| 2007/0223422 | A1 | 9/2007  | Kim et al. |
| 2007/0280160 | A1 | 12/2007 | Kim et al. |
| 2008/0014960 | A1 | 1/2008  | Chou |
| 2008/0089312 | A1 | 4/2008  | Malladi |
| 2008/0095109 | A1 | 4/2008  | Malladi et al. |

(Continued)

FOREIGN PATENT DOCUMENTS

| WO | 99/21389 A1    | 4/1999 |
| WO | 2007052115 A2  | 5/2007 |

(Continued)

OTHER PUBLICATIONS

United States Patent and Trademark Office, "Non-Final Office Action" for U.S. Appl. No. 12/712,191 dated Aug. 22, 2012, 19 pages.

(Continued)

*Primary Examiner* — Kevin C Harper
*Assistant Examiner* — Henry Baron

(57) ABSTRACT

A method (300, 500) and apparatus (200) that transmits and/or receives positioning reference signals in a wireless communication network using a mixture of cyclic prefix types. The method may include configuring (320) subframes in the wireless communication network as multicast broadcast single frequency network subframes. The method may include configuring (330) subframes in the wireless communication network as positioning subframes including positioning reference signals. The method may include determining (340) whether all of the positioning subframes are multicast broadcast single frequency network subframes. The method may include generating (350) extended cyclic prefix positioning reference signals for all of the positioning subframes if all of the positioning subframes are multicast broadcast single frequency network subframes.

20 Claims, 8 Drawing Sheets

U.S. PATENT DOCUMENTS

| | | |
|---|---|---|
| 2008/0132247 A1 | 6/2008 | Anderson |
| 2008/0133462 A1 | 6/2008 | Aylward et al. |
| 2008/0159239 A1 | 7/2008 | Odlyzko et al. |
| 2008/0167040 A1 | 7/2008 | Khandekar et al. |
| 2008/0170602 A1 | 7/2008 | Guey |
| 2008/0170608 A1 | 7/2008 | Guey |
| 2008/0212520 A1 | 9/2008 | Chen et al. |
| 2008/0232395 A1 | 9/2008 | Buckley et al. |
| 2008/0267310 A1 | 10/2008 | Khan et al. |
| 2008/0274753 A1 | 11/2008 | Attar et al. |
| 2008/0307427 A1 | 12/2008 | Pi et al. |
| 2009/0041151 A1 | 2/2009 | Khan et al. |
| 2009/0061887 A1 | 3/2009 | Hart et al. |
| 2009/0122758 A1 | 5/2009 | Smith et al. |
| 2009/0228598 A1 | 9/2009 | Stamoulis et al. |
| 2009/0238131 A1 | 9/2009 | Montojo et al. |
| 2009/0252077 A1 | 10/2009 | Khandekar et al. |
| 2009/0262699 A1 | 10/2009 | Wengerter et al. |
| 2009/0268675 A1 | 10/2009 | Choi |
| 2009/0285321 A1 | 11/2009 | Schulz et al. |
| 2010/0046460 A1 | 2/2010 | Kwak et al. |
| 2010/0056166 A1 | 3/2010 | Tenny |
| 2010/0118839 A1 | 5/2010 | Malladi et al. |
| 2010/0165882 A1 | 7/2010 | Palanki et al. |
| 2010/0167743 A1 | 7/2010 | Palanki et al. |
| 2010/0172310 A1 | 7/2010 | Cheng et al. |
| 2010/0172311 A1 | 7/2010 | Agrawal et al. |
| 2010/0182903 A1 | 7/2010 | Palanki et al. |
| 2010/0195566 A1 | 8/2010 | Krishnamurthy et al. |
| 2010/0260154 A1 | 10/2010 | Frank et al. |
| 2010/0311437 A1 | 12/2010 | Palanki et al. |
| 2010/0323718 A1 | 12/2010 | Jen |
| 2011/0143770 A1 | 6/2011 | Charbit et al. |
| 2011/0143773 A1 | 6/2011 | Kangas et al. |
| 2011/0148700 A1 | 6/2011 | Lasagabaster et al. |
| 2011/0149868 A1 | 6/2011 | Krishnamurthy et al. |
| 2011/0149903 A1 | 6/2011 | Krishnamurthy et al. |
| 2011/0190016 A1 | 8/2011 | Hamabe et al. |
| 2011/0244884 A1 | 10/2011 | Kangas et al. |
| 2011/0268101 A1 | 11/2011 | Wang et al. |
| 2011/0286349 A1 | 11/2011 | Tee et al. |
| 2012/0002609 A1 | 1/2012 | Larsson et al. |

FOREIGN PATENT DOCUMENTS

| | | | |
|---|---|---|---|
| WO | 2008033117 A1 | 3/2008 | |
| WO | 2008137354 A1 | 11/2008 | |
| WO | 2008137607 A2 | 11/2008 | |
| WO | 2010080845 A2 | 7/2010 | |

OTHER PUBLICATIONS

Patent Cooperation Treaty, "PCT Search Report and Written Opinion of the International Searching Authority" for International Application No. PCT/US2011/044103 Oct. 24, 2011, 15 pages.

3GPP TSG RAN WG1 #59bis, Jan. 18-22, 2009, Jeju, Valencia, Spain, Change Request "Clarification of the CP length of empty OFDM symbols in PRS subframes" Ericsson, St-Ericsson, Motorola, Qualcomm Inc, R1-100311; 2 pages.

United States Patent and Trademark Office, "Notice of Allowance and Fee(s) Due" for U.S. Appl. No. 13/040,090 dated Mar. 8, 2012, 6 pages.

Patent Cooperation Treaty, "PCT Search Report and Written Opinion of the International Searching Authority" for International Application No. PCT/US2010/036982 Nov. 22, 2010, 17 pages.

3GPP TS 25.305 V8.1.0 (Dec. 2008) 3rd Generation Partnership Project; Technical Specification Group Radio Access Network; Stage 2 functional specificaiton of User Equipment (UE) positiong in UTRAN (Release 8), 80 pages.

3GPP TSG RAN WG2 #66bis, R2-093855; "Evaluation of protocol architecture alternatives for positioning" Qualcomm Europe, et al., Jun. 29-Jul. 3, 2009, Los Angeles, CA, USA; 4 pages.

3GPP TS 36.305 V0.2.0 (May 2009) 3rd Generation Partnership Project; Technical Specification Group Radio Access Network; Evolved Universal Terrestrial Radio Access (E-UTRA); Stage 2 functional specification of User Equipment (UE) positioning in E-UTRA.

3GPP TSG RAN WG1 #57, R1-091911; "Discussions on UE positioning issues" Nortel, May 4-8, 2009, San Francisco, USA; 12 pages.

3GPP TS 04.35 V8.3.0 (Jan. 2001) 3rd Generation Partnership Project; Technical Specification Group GSM EDGE Radio Access network; Location Services (LCS); Broadcast network Assistance for Enhanced Observed Time Difference (E-OTD) and Global Positioning.

United States Patent and Trademark Office, "Non-Final Rejection" for U.S. Appl. No. 12/492,339 dated Aug. 19, 2011, 14 pages.

Patent Cooperation Treaty, "PCT Search Report and Written Opinion of the International Searching Authority" for International Application No. PCT/US2010/041451 Oct. 25, 2010, 16 pages.

United States Patent and Trademark Office, "Non-Final Rejection" for U.S. Appl. No. 12/542,374 dated Dec. 23, 2011, 23 pages.

Patent Cooperation Treaty, "Search Report and Written Opinion" for International Application No. PCT/US2011/025607 Aug. 19, 2011, 21 pages.

3GPP TSG-RAN WG1 #57, R1-091912 "Simulation results on UE positioning using positioning reference signals" Nortel; San Francisco, USA, May 4-8, 2009, 11 pages.

United States Patent and Trademark Office, "Non-Final Rejection" for U.S. Appl. No. 12/573,456 dated Nov. 18, 2011, 10 pages.

United States Patent and Trademark Office, "Final Rejection" for U.S. Appl. No. 12/573,456 dated Mar. 21, 2012, 14 pages.

3GPP TSG RAN WG1 #59, Nov. 9-13, 2009, Jeju, South Korea, Change Request 36.211 "Introduction of LTE positioning" Ericsson, R1-095027; 6 pages.

3rd Generation Partnership Project; Technical Specification Group Radio Access Network; Evolved Universal Terrestrial Radio Access (E-UTRA); Physical Channels and Modulation; Release 9; Dec. 2009.

Motorola; Text Proposal on Orthogonal PRS Transmissions in Mixed CP Deployments Using MBSFN Subframes; #59 Jeju, Korea, Nov. 9-13, 2009 (R1-095003).

3rd Generation Partnership Project; Introduction of LTE Positioning; Meeting #59; Jeju, South Korea; Nov. 9-13, 2009 (R1-095207).

3rd Generation Partnership Project; Draft CR 36.214 Introduction of LTE Positioning; Meeting #58; Shenzhen, China; Aug. 24-28, 2009; (R1-09xxxx).

3rd Generation Partnership Project; Draft CR 36.211 Introduction of LTE Positioning; Meeting #58; Shenzhen, China; Aug. 24-28, 2009; (R1-09xxxx).

3rd Generation Partnership Project; Draft CR 36.213 Introduction of LTE Positioning; Meeting #58; Shenzhen, China; Aug. 24-28, 2009; (R1-09xxxx).

3rd Generation Partnership Project; Introduction of LTE Positioning; Meeting #59; Jeju, South Korea; Nov. 9-13, 2009; (R1-094430).

3rd Generation Partnership Project; Introduction of LTE Positioning; Meeting #59; Jeju, South Korea; Nov. 9-13, 2009; (R1-094429).

3rd Generation Partnership Project; Clarification of PDSCH and PRS in Combination for LTE Positioning; Meeting #58bis); Miyazaki, Japan; Oct. 12-16, 2009 (R10094262).

3GPP TS 36.211 V8.6.0, Technical Specification Group Radio Access Network; E-UTRA; Physical Channels and Modulation: (Release 8) Mar. 2009; 83 pages.

3GPP TS 36.211 v8.4.0 Technical Specification Group Radio Access Network; E-UTRA; Physical Channels and Modulation (Release 8); Sep. 2008; 78 pages.

3GPP TSG RAN WG1 #55bis, Ljubljana, Slovenia; Jan. 12-19, 2009, "On OTDOA in LTE" QUALCOMM, R1-090353, 8 pages.

3GPP TSG RAN #42, Athens, Greece, Dec. 2-5, 2008, "Positioning Support for LTE" Article 39, 3GPP TR 21.900; RP-080995, 6 pages.

USPTO Notice of Allowance for U.S. Appl. No. 12/365,166 Apr. 16, 2010, 11 pages.

USPTO Notice of Allowance for U.S. Appl. No. 12/365,166 Aug. 25, 2010, 9 pages.

USPTO Patent Application Titled "Interference Control SINR Optimization and Signaling Enhancements to Improve the Performance of OTDOA Measurements" U.S. Appl. No. 12/813,221, filed Jun. 10, 2010.

3GPP TSG RAN WG1 #55bis; Ljubljana, Slovenia; Jan. 12-16, 2009, "Improving the hearability of LTE Positioning Service" Alcatel-Lucent, R1-090053, 5 pages.

Patent Cooperation Treaty, "PCT Invitation to Pay Additional Fees and, where Applicable, Protest Fee" for International Application No. PCT/US2010/038257 Oct. 1, 2010, 9 pages.

3GPP TSG RAN WG4 (Radio) #20, New Jersey, USA; Nov. 12-16, 2001, UTRAN SFN-SFN observed time difference measurement & 3GPP TS 25.311 IE 10.3.7.106 "UE positioning OTDOA neighbour cell info' assistance data fields", Tdoc R4-011408, 4 pages.

John P. Costas, "A Study of a Class of Detection Waveforms Having Nearly Ideal Range-Doppler Ambiguity Properties," Proc. IEEE, vol. 72, No. 8, Aug. 1984, pp. 996-1009.

Jiann-Ching Guey, "Synchronization Signal Design for OFDM Based on Time-Frequency Hopping Patterns", Proceedings of IEEE International Conference on Communications, 2007, pp. 4329-4334.

3GPP TSG RAN WG1 #56bis, Mar. 23-27, 2009, Seoul, South Korea; "Reference Signals for Low Interference Subframes in Downlink" Ericsson, R1-091314; 8 pages.

3GPP TSG RAN1 #58 Aug. 24-28, 2009, Shenzhen, P.R. China, "Positioning Subframe Muting for OTDOA Measurements" Motorola, R1-093406; 9 pages.

3GPP TSG RAN WG1 #58, Aug. 24-28, 2009, "LS on assistance information for OTDOA positioning support for LTE" R1-093729, 3 pages.

Patent Cooperation Treaty, "PCT Search Report and Written Opinion of the International Searching Authority" for International Application No. PCT/US2010/030516 Oct. 8, 2010, 24 pages.

3GPP TSG RAN WG1 #56, Athens, Greece; Feb. 9-13, 2009 "On OTDOA method for LTE Positioning" Ericsson, R1-090918, 6 pages.

USPTO Patent Application Titled "A Wireless Terminal and Method for Managing the Receipt of Position Reference Signals for Use in Determining a Location" U.S. Appl. No. 12/492,339, filed Jun. 26, 2009.

3GPP TSG RAN WG1 #56bis, Feb. 9-13, 2009; Athens, Greece; PHY Layer Specification Impact of Positiong Improvements Qualcomm Europe, R1-090852, 3 pages.

3GPP TSG RAN WG1 #56bis, Mar. 23-27, 2009, "Further details on DL OTDOA" Ericsson, R1-091312, 6 pages.

USPTO Patent Application Titled "Muting Time Masks to Suppress Serving Cell Interference for Observed Time Difference of Arrival Location" U.S. Appl. No. 12/542,374, filed Aug. 17, 2009.

3GPP TSG RAN1 #57, Jun. 29-Jul. 3, 2009; Los Angeles, CA, USA; "On Serving Cell Muting for OTDOA Measurements" Motorola, R1-092628, 7 pages.

3GPP TSG RAN3 #68, May 10-14, 2010, Montreal, Canada "Addition of PRS Muting Configuration information to LPPa" Ericsson, R3-101526, 7 pages.

3GPP TSG RAN2 #70, May 10-14, 2010, Montreal, Canada "Signalling support for PRS muting in OTDOA" Ericsson, St-Ericsson; R2-103102, 2 pages.

USPTO Patent Application Titled "Restrictions on Autonomous Muting to Enable Time Difference of Arrival Measurements" U.S. Appl. No. 61/295,678, filed Jan. 15, 2010.

3GPP TSG RAN WG4 #53, Nov. 9-13, 2009, Jeju, South Korea; "System simulation results for OTDOA" Ericsson, R4-094532; 3 pages.

USPTO Patent Application Titled "Threshold Determination in TDOA-Based Positioning System" U.S. Appl. No. 12/712,191, filed Feb. 24, 2010.

3GPP TS 36.213 V9.0.0, Technical Specification Group Radio Access Network, E-UTRA, "Physical layer procedures (Release 9)" Dec. 2009, 79 pages.

3GPP TS 36.355 V9.0.0, Technical Specification Group Radio Access Network, E-UTRA, "LTE Positioning Protocol (LLP) (Release 9)" Dec. 2009, 102 pages.

USPTO Patent Application Titled "Autonomous Muting Indication to Enable Improved Time Difference of Arrival Measurements" U.S. Appl. No. 12/573,456, filed Oct. 5, 2009.

United States Patent and Trademark Office, "Non-Final Rejection" for U.S. Appl. No. 12/542,374, dated Aug. 31, 2012, 28 pages.

METHOD AND APPARATUS FOR TRANSMITTING POSITIONING REFERENCE SIGNALS IN A WIRELESS COMMUNICATION NETWORK

BACKGROUND

1. Field

The present disclosure is directed to a method and apparatus for transmitting positioning reference signals in a wireless communication network. More particularly, the present disclosure is directed to preserving orthogonality of positioning reference signals in a network using a mixture of cyclic prefix types.

2. Introduction

Presently, positioning subframes are used by user equipment, such as a mobile terminal, a cell phone, a personal digital assistant, or other user equipment, to determine observed time difference of arrival of positioning subframes from neighbor cells relative to positioning subframes of serving cell using cross-correlation. The observed time difference of arrival is sent to a location server, which computes the location of the user equipment.

Every cell in a network sends out positioning reference signal periodically in positioning subframes. The positioning subframes from the cells are time aligned with other cells for determining the observed time difference of arrival.

A cyclic prefix (CP) can be added to a symbol to reduce or eliminate inter-symbol interference. A Long Term Evolution (LTE) wireless network can use a normal cyclic prefix or an extended cyclic prefix, where normal and extended refer to the length of the cyclic prefix. For example, a normal size cell may use a normal cyclic prefix length because the delay spread of the propagation channel is relatively small. A larger cell may use an extended cyclic prefix length to overcome a larger delay spread in the propagation channel in order to preserve the orthogonality of symbols modulating neighboring subcarriers. A subframe having an extended cyclic prefix can have fewer symbols than a normal cyclic prefix subframe because a subframe can have a fixed length and the extended cyclic prefix symbols are longer than normal cyclic prefix symbols.

In order to perform the cross-correlation, user equipment must be able to construct the reference signal, and to construct the reference signal, the user equipment must know whether the signal is normal cyclic prefix or extended cyclic prefix, because the reference signal time-frequency patterns are different. Assistance data can inform user equipment of whether neighbor cells have the same cyclic prefix or a different cyclic prefix as a reference cell. It is desirable to keep the amount of assistance data low to reduce the amount of data transmitted. Thus, if a neighbor cell has the same cyclic prefix as the reference cell, the bit field indicating the cyclic prefix length is absent. The user equipment infers that the cyclic prefix lengths are identical by suitably parsing the assistance data and determining that the bit field is absent. On the other hand, if the neighbor cell has a different cyclic prefix than the reference cell, a bit can be transmitted with each neighbor cell physical identifier to indicate the cyclic prefix of the neighbor cell relative to the reference cell.

There is a problem when there is a mixed deployment of cells using extended cyclic prefix and cells using normal cyclic prefix because the symbol boundaries do not align between the normal cyclic prefix cells and the extended cyclic prefix. The symbol boundaries do not align because the subframes are fixed in length and the extended cyclic prefix symbols are longer than the normal cyclic prefix symbols. Therefore, extended cyclic prefix symbols have different boundaries than the normal cyclic prefix symbols. This causes a problem when using cross-correlation to determine the observed time difference of arrival of positioning subframes from neighbor cells relative to positioning subframes of serving cell. This problem is exacerbated by the fact that subframes cannot use a mix of extended cyclic prefix and normal cyclic prefix, in part due to such a scheme requiring excessive amounts of assistance data to indicate the cyclic prefix for each subframe.

Thus, there is a need for a method and apparatus that transmits and/or receives positioning reference signals in a wireless communication network using a mixture of cyclic prefix types.

SUMMARY

A method and apparatus that transmits and/or receives positioning reference signals in a wireless communication network using a mixture of cyclic prefix types. The method may include configuring subframes in the wireless communication network as multicast broadcast single frequency network subframes. The method may include configuring subframes in the wireless communication network as positioning subframes including positioning reference signals. The method may include determining whether all of the positioning subframes are multicast broadcast single frequency network subframes. The method may include generating extended cyclic prefix positioning reference signals for all of the positioning subframes if all of the positioning subframes are multicast broadcast single frequency network subframes.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

Figure 1:
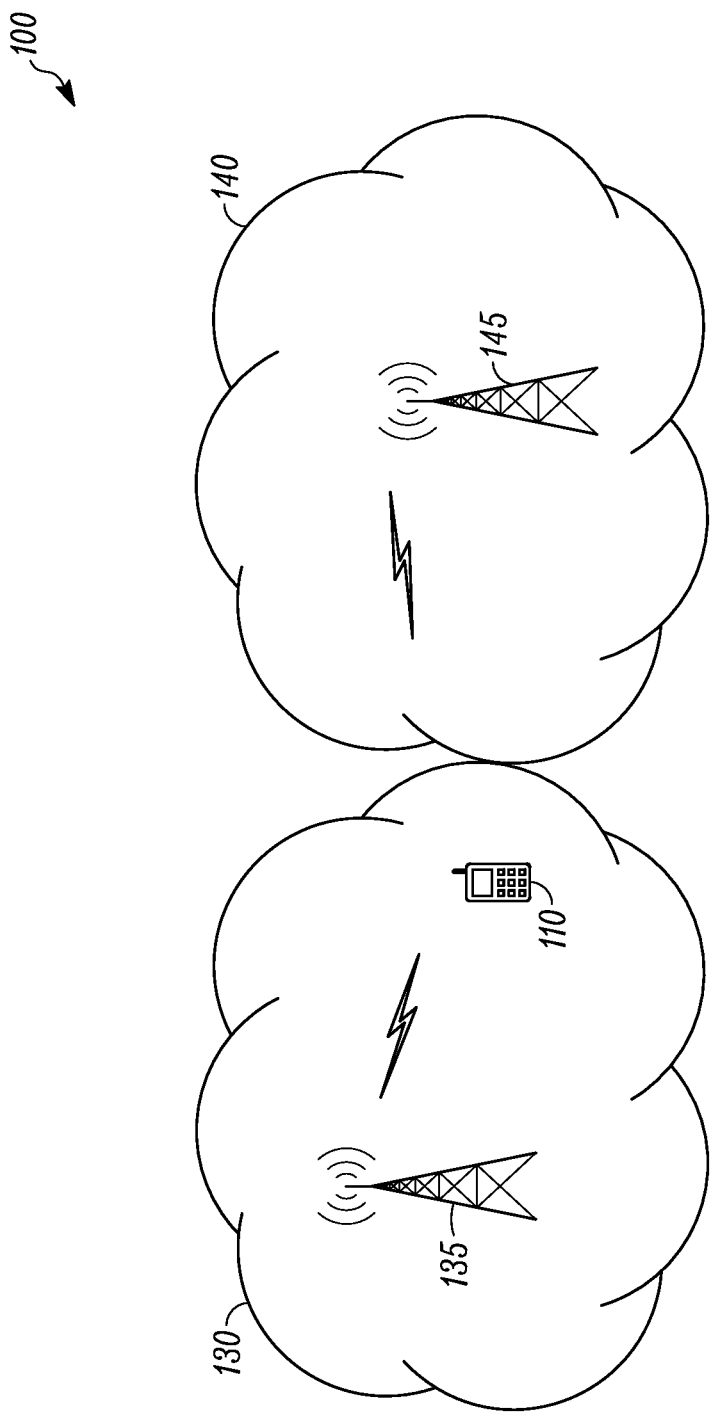
FIG. 1 illustrates an example block diagram of a system in accordance with a possible embodiment.

FIG. 1 is an example block diagram of a system 100 according to one embodiment. The system 100 can be part of a wireless communication network, such as a wireless telecommunication system, such as a Long Term Evolution (LTE) system, a cellular telephone system, a Time Division Multiple Access (TDMA)-based system, a Code Division Multiple Access (CDMA)-based system, a satellite communications system, and other wireless telecommunications systems. Furthermore, the system 100 may include more than one system and may include a plurality of different types of systems. Thus, the system 100 may include a plurality of data networks, a plurality of telecommunications networks, a combination of data and telecommunications networks and other like communication systems capable of sending and receiving communication signals.

The system 100 can include a user equipment (UE) 110, a first cell 130 having a first base station 135, and a second cell 140 having a second base station 145. The user equipment 110 may be a wireless communication device, a wireless telephone, a cellular telephone, a personal digital assistant, a pager, a personal computer, a selective call receiver, or any other device that is capable of sending and receiving communication signals on a wireless communication network. The base stations 135 and 145 may be cellular base stations, such as enhanced Node Base stations (eNB), wireless local area network access points, or any other devices that provides access between a wireless device and a network. The first base station 135 may be a serving base station and/or may be a reference base station. Similarly the first cell 130 may be a serving base cell and/or may be a reference base cell. The second base station 145 may be a neighbor cell and the second cell 140 may be a neighbor cell. The system 100 can include additional cells and base stations, such as additional neighbor cells and base stations and other cells and base stations (not shown).

In operation, the system 100 can configure subframes in the wireless communication network as multicast broadcast single frequency network (MBSFN) subframes. The system 100 can configure subframes in the wireless communication network as positioning subframes including positioning reference signals. The system 100 can determine whether all of the positioning subframes are multicast broadcast single frequency network subframes. The system 100 can generate extended CP positioning reference signals for all of the positioning subframes if all of the positioning subframes are multicast broadcast single frequency network subframes.

For example, for Multicast Broadcast Single Frequency Network (MBSFN) transmissions, data can be sent to multiple user equipment over a large area. Extended cyclic prefix can be often used for MBSFN because there is more delay spread when sending data to multiple user equipment over a large area. In an area where there is a mix of normal cyclic prefix and extended cyclic prefix cells, MBSFN subframes can be used to transmit extended cyclic prefix positioning subframes from normal cyclic prefix cells so that the transmission is orthogonal to positioning subframes from extended cyclic prefix cells. Transmitting positioning reference signal only in MBSFN subframes can therefore provide a common cyclic prefix between normal cyclic prefix cells and extended cyclic prefix cells. The MBSFN subframes can be used for this purpose because they can use normal cyclic prefix or extended cyclic prefix, even when transmitted from a normal cyclic prefix cell, which must otherwise use normal cyclic prefix for normal (non-MBSFN) subframes. This could not previously be achieved because previously the orthogonal frequency division multiplexed symbols in a MBSFN subframe configured for positioning reference signal transmission were required to use the same cyclic prefix as the cyclic prefix used for subframe zero, which is required to be normal cyclic prefix for a normal cyclic prefix cell transmitting subframe zero with a normal cyclic prefix, where subframe zero is the first subframe in a frame.

The positioning subframes can have positioning reference signals (PRS) and can also have other signals. A positioning reference signal comprises a sequence of constellation points mapped to resource elements (REs) on at least one OFDM symbol of a positioning subframe. The constellation points can be Quadrature Phase Shift Keying (QPSK) symbols.

The system can transmit assistance data regarding a neighbor cell, such as the second cell 140. The assistance data can include information pertaining to the cyclic prefix length of neighbor cells including the second cell 140. For example, assistance data can include positioning assistance data. The CP information for the reference cell, such as the first cell 130, and the neighbor cells can be included in the assistance data as, for example, zero or one bit per cell. On the other hand, the MBSFN configuration for the serving cell, such as the first cell 130, can be signaled in Radio Resource Control (RRC) messages. For OTDOA positioning, the reference cell need not be the serving cell, although the serving cell can often be the reference cell.

The assistance data can indicate a neighbor cell transmitting normal CP (NCP) is the same CP as the reference cell when the neighbor cell is transmitting extended CP MBSFN positioning subframes if only MBSFN subframes are configured for PRS transmission from the reference cell. However, it is possible that both the reference and neighbor cells use only normal subframes or use both normal and MBSFN subframes for transmitting PRS. In the latter case, the reference cell can transmit extended CP PRS and the neighbor cell can transmit NCP PRS when the reference cell uses extended CP in normal subframes and the neighbor cell uses normal CP in normal subframes. Although this can result in loss of PRS orthogonality and may likely never be done, it is still a valid configuration that the UE 110 can understand.

The assistance information can include one bit sent for a neighbor cell only if its PRS CP differs from the reference cell PRS CP. If the reference cell is extended CP, such as in subframe #0, it does not have to indicate that the neighbor is transmitting extended CP. If the reference cell is normal CP, such as in subframe #0, and it is using either only normal or both normal and MBSFN subframes as positioning subframes, it does not have to indicate that the neighbor cell is transmitting normal CP.

According to one example of MBSFN configuration and assistance data, The UE 110 can determine that the reference cell has either normal CP or extended CP in subframe #0, such as in unicast transmission, based on cell search or successful decoding of PBCH. If PRS is transmitted in both MBSFN subframes and normal subframes, PRS transmitted in MBSFN subframes can have the same CP type as that for subframe #0, such as unicast. If PRS is transmitted only in MBSFN subframes, PRS can be transmitted using extended CP. If PRS is transmitted only in normal subframes, PRS can be transmitted using the same CP length as that for subframe #0. From these rules, a given enhanced NodeB (eNB), such as a base station, can transmit PRS either using normal CP in all subframes or extended CP in all subframes. It may not transmit a mixture of normal and extended CP. However, it is possible that PRS from one eNB can be transmitted on normal CP while PRS from a neighbor eNB can be transmitted on extended CP, although PRS orthogonality may be lost in this case.

The LPP signaling bit indicating the CP length information for the reference cell, such as a serving cell, should be sent in the assistance information and the indicated length should be identical to the CP length in subframe #0 if PRS is transmitted either only in normal subframes or if it is transmitted in both normal and MBSFN subframes. Alternately, the indicated length should be identical to extended CP if PRS is transmitted only in MBSFN subframes.

The LPP signaling bit indicating the CP length information for neighbor cell can be sent if the neighbor cell CP length for PRS is different from that used for the reference cell, such as the serving cell PRS. In this embodiment, the UE can use the LPP signaling bit indicating the CP length information for the reference cell and the LPP signaling bit indicating the CP length information for neighbor to determine the CP length of PRS. In an alternative embodiment, RRC signaling from the serving cell can include the MBSFN configuration of the serving cell, such as information on which subframes are normal subframes and which are MBSFN subframes. It also can include a bit indicating whether neighbor cells share the same MBSFN configuration as the serving cell or not. If the neighbor cells share the same MBSFN configuration as that for the serving cell, the UE can know which subframes are normal and which subframes are MBSFN for all neighbors. In this case, the UE can determine PRS is transmitted in both MBSFN subframes and normal subframes to determine the CP length of the PRS transmission for all neighbors.

The system 100 can use a CP of a first subframe as the CP for the positioning subframes if all of the positioning subframes are not multicast broadcast single frequency network subframes. For example, if there is a mixture of MBSFN subframes and normal subframes, the subframes can use the same CP as a first subframe in the frame. If all of positioning subframes are MBSFN subframes, the MBSFN positioning subframes can be required to use extended CP. As a further example, if only MBSFN subframes are configured as positioning subframes within a cell, the OFDM symbols configured for positioning reference signals in these subframes shall use extended CP length.

To elaborate on an example, MBSFN subframes configured as positioning subframes in extended CP cells should use extended CP in this example. In normal CP (NCP) cells, if only MBSFN subframes are configured as positioning subframes, NCP can be used for 1 or 2 control symbols at the start of the these subframes. A gap of less than one symbol can follow the 1 or 2 control symbols, after which there can be 11 (for 1 control symbol) or 10 (for 2 control symbols) extended CP symbols, so that the total number of OFDM symbols in these MBSFN subframes is 12. The positioning reference symbols are mapped into a subset of the extended CP symbols in these subframes in accordance with the PRS mappings defined for the extended CP positioning subframes.

NCP symbols are typically shorter in length than extended CP symbols. However, a cell transmitting NCP subframe #0 can transmit an MBSFN subframe which has a mixture of NCP symbols (control) and extended CP symbols (Physical Multicast Channel or PMCH). For example, for OFDM baseband signal generation, a time-continuous signal $s_l^{(p)}(t)$ on antenna port p in OFDM symbol l in a downlink slot can be defined by:

$$s_l^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k \Delta f(t - N_{CP,l} T_s)} +$$

-continued $$\sum_{k=1}^{\lfloor N_{RB}^{DL} N_{sc}^{RB}/2 \rfloor} a_{k^{(+)},l}^{(p)} \cdot e^{j2\pi k \Delta f(t - N_{CP,l} T_s)}$$

for $0 \leq t < (N_{CP,l}+N) \times T_s$ where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor -1$. The variable N can equal 2048 for $\Delta f=15$ kHz subcarrier spacing and 4096 for $\Delta f=7.5$ kHz subcarrier spacing.

The OFDM symbols in a slot can be transmitted in increasing order of l, starting with l=0, where OFDM symbol l>0 starts at time $$\sum_{l'=0}^{l-1} (N_{CP,l'} + N) T_s$$

within the slot. In case the first OFDM symbol(s) in a slot use normal CP and the remaining OFDM symbols use extended CP, the starting position the OFDM symbols with extended CP should be identical to those in a slot where all OFDM symbols use extended CP according to this example. Thus, there can be a part of the time slot between the two CP regions where the transmitted signal may not be specified. Different OFDM symbols within a slot in some cases can have different CP lengths.

The system 100 can configure subframes in the wireless communication network as positioning subframes by configuring a plurality of consecutive subframes in the wireless communication network as positioning subframes. The configured subframes can be N number of subframes, where N can be 1, 2, 4, 6, or any other number of consecutive subframes transmitted with a certain periodicity T, where T can be 160 ms, 320 ms, 640 ms, 1280 ms or any other periodicity. The N consecutive subframes configured for PRS transmission comprise one PRS occasion.

The system 100 can determine whether only multicast broadcast single frequency network subframes are configured as positioning subframes within the cell. The system 100 can generate extended CP positioning reference signals for all of the positioning subframes if only MBSFN subframes are configured as positioning subframes within the cell. For example, determining whether all of the positioning subframes are multicast broadcast single frequency network subframes can comprise determining whether normal subframes, both normal and multicast broadcast single frequency network subframes, or only multicast broadcast single frequency network are configured as positioning subframes within the cell. The positioning reference signals can be generated using an extended CP if only multicast broadcast single frequency network subframes are configured as positioning subframes within the cell. Determining whether only MBSFN subframes are being used for PRS can involve using RRC information pertaining to the MBSFN configuration of the serving cell.

The system 100 can generate a same CP for positioning reference signals as a CP used for a first subframe of the radio frame if both normal and multicast broadcast single frequency network subframes are configured as positioning subframes within the cell. For example, the positioning reference signals can be generated using a same CP for positioning reference signals as a CP used for a first subframe for orthogonal frequency division multiplexed symbols in a multicast broadcast single frequency network subframe configured for positioning reference signals transmission if both normal and multicast broadcast single frequency network subframes are configured as positioning subframes within the cell. The system 100 can transmit positioning reference signals only in resource blocks in downlink subframes configured for positioning reference signals transmission.

The system 100 can receive information from a network entity. The network entity can be a base station, a gateway, a network controller, or any other network entity. The received information can indicate whether to transmit normal CP or extended CP positioning reference signals. The system 100 can then configure subframes in the wireless communication network as positioning subframes based on the received information. If there is a mixture of MBSFN and normal subframes configured for positioning reference signals transmission, the OFDM symbols in the positioning reference signals subframes use the same CP as used for subframe #0.

For example, if there are six consecutive positioning reference subframes, with three normal, then one MBSFN, then two normal subframes, the same CP can be used as the CP used for the first subframe of the frame. In particular, if the normal subframes use normal CP, then the MBSFN subframe can use normal CP. Otherwise, a base station may not know which positioning reference subframes are normal CP and which are extended CP.

Therefore if there is a mixture of MBSFN subframes and normal subframes, the positioning reference signal subframes can use the same CP as subframe zero. If all of the positioning reference signal subframes are MBSFN subframes, then the subframes can use extended CP, regardless of the CP of subframe #0.

The system 100 can receive time difference of arrival information from a wireless device. For example, the first base station 135 can receive the time difference of arrival information from the UE 110. The time difference of arrival information can be based on the positioning reference signals. The system 100 can transmit information regarding a position of the wireless device based on the time difference of arrival information.

Figure 2:
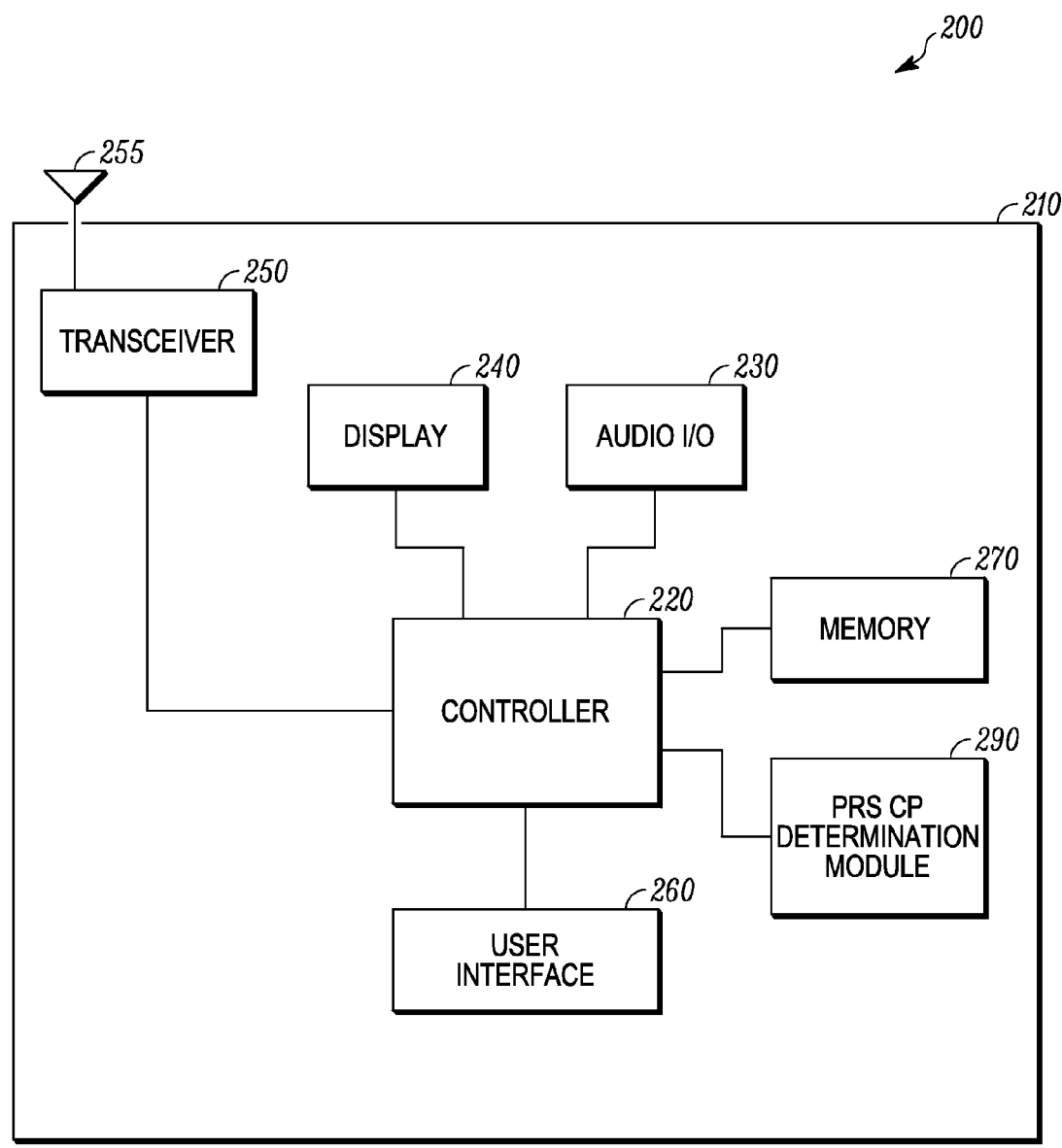
FIG. 2 illustrates an example block diagram of a wireless communication device in accordance with a possible embodiment.

FIG. 2 is an example block diagram of a wireless communication device 200, such as the user equipment 110, according to a possible embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, an antenna 255 coupled to the transceiver 250, a user interface 260 coupled to the housing 210, and a memory 270 coupled to the housing 210. The wireless communication device 200 can also include a positioning reference signal cyclic prefix determination module 290. The positioning reference signal cyclic prefix determination 290 module can be coupled to the controller 220, can reside within the controller 220, can reside within the memory 270, can be an autonomous module, can be software, can be hardware, or can be in any other format useful for a module on a wireless communication device 200.

The display 240 can be a liquid crystal display (LCD), a light emitting diode (LED) display, a plasma display, a touch screen display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, a touch screen display, or any other device useful for providing an interface between a user and an electronic device. The memory 270 can include a random access memory, a read only memory, an optical memory, a subscriber identity module memory, or any other memory that can be coupled to a wireless communication device.

In operation, the transceiver 250 can transmit and receive signals over a wireless communication network. The transceiver 250 can receive a positioning reference signal indication in assistance data received from a serving cell. The positioning reference signal indication can correspond to a CP length of a PRS transmission for a reference cell or a neighbor cell. The controller 220 can control operations of the wireless communication device 200.

The positioning reference signal cyclic prefix determination module 290 can determine whether all PRS symbols within at least one PRS occasion use only extended CP when only Multicast Broadcast Single Frequency Network (MBSFN) subframes are configured for PRS transmission, The positioning reference signal cyclic prefix determination module 290 can determine whether all PRS symbols within at least one PRS occasion use only extended CP. The positioning reference signal cyclic prefix determination module 290 can determine whether PRS symbols in MBSFN subframes use the same CP length as that for normal subframes when both normal and MBSFN subframes are configured for PRS transmission. The positioning reference signal cyclic prefix determination module 290 can determine a CP length of PRS transmission within one PRS occasion is extended CP based on the indication in the assistance data and based on the determination that all PRS symbols within at least one PRS occasion use only extended CP when only MBSFN subframes are configured for PRS transmission. The positioning reference signal indication can include at least one bit signaled in long term evolution positioning protocol assistance data received from a serving cell, where the assistance data can include at least one CP length indicator bit if a CP length of a neighbor cell is different from the CP length of the reference cell and the assistance data can exclude the at least one CP length indicator bit if a CP length of a neighbor cell is the same as a CP length of a reference cell.

The transceiver 250 can receive a reference cell transmission including reference cell positioning reference signal subframes from the reference cell and can receive a neighbor cell transmission including neighbor cell positioning reference signal subframes from the neighbor cell. The controller 220 can determine a time difference of arrival of the neighbor cell transmission relative to the reference cell transmission based on the received PRS subframes. The transceiver 250 can transmit the time difference of arrival to the serving cell to obtain information regarding the position of the wireless communication device 200.

Figure 3:
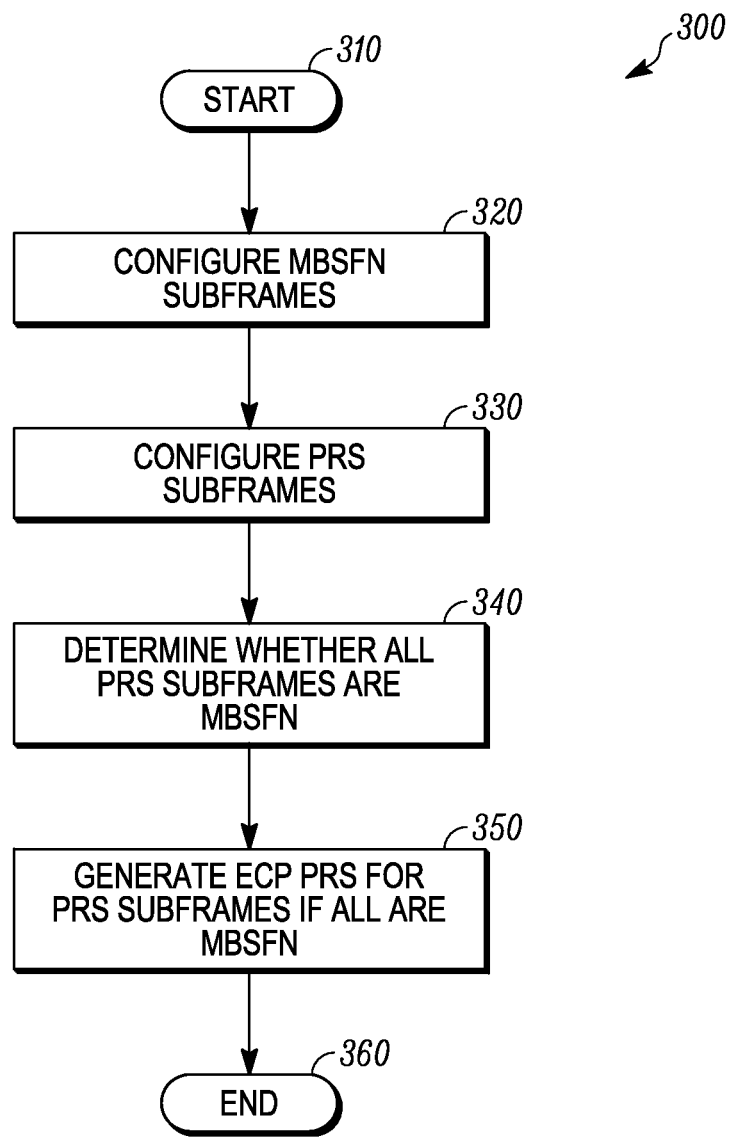
FIG. 3 is an example flowchart illustrating the operation of a network entity in a wireless communication network according to a possible embodiment.

FIG. 3 is an example flowchart 300 illustrating the operation of a base station, such as the base station 135, or other network entity in a wireless communication network according to a possible embodiment. At 310, the flowchart begins. At 320, subframes in the wireless communication network can be configured as multicast broadcast single frequency network (MBSFN) subframes. At 330, subframes in the wireless communication network can be configured as positioning subframes including positioning reference signals. The subframes in the wireless communication network can be configured as positioning subframes by configuring a plurality of consecutive subframes in the wireless communication network as positioning subframes. At 340, it can be determined whether all of the positioning subframes are multicast broadcast single frequency network subframes. For example, a network entity can determine whether all of the positioning subframes are multicast broadcast single frequency network subframes by determining whether only multicast broadcast single frequency network subframes in a PRS occurrence are configured as positioning subframes within the cell. A PRS occurrence can be a group of PRS transmitted from a single cell. At 350, extended CP positioning reference signals can be generated for all of the positioning subframes if all of the positioning subframes are multicast broadcast single frequency network subframes. For example, extended CP positioning reference signals can be generated for all of the positioning subframes in a PRS occurrence if only multicast broadcast single frequency network subframes are configured as positioning subframes within the cell. At 350, the flowchart 300 ends.

According to some embodiments, all of the blocks of the flowchart 300 are not necessary. Additionally, the flowchart 300 or blocks of the flowchart 300 may be performed numerous times, such as iteratively. For example, the flowchart 300 may loop back from later blocks to earlier blocks. Furthermore, many of the blocks can be performed concurrently or in parallel processes. Functions of the system 100 described above can also be incorporated into the flowchart 300.

Figure 4:
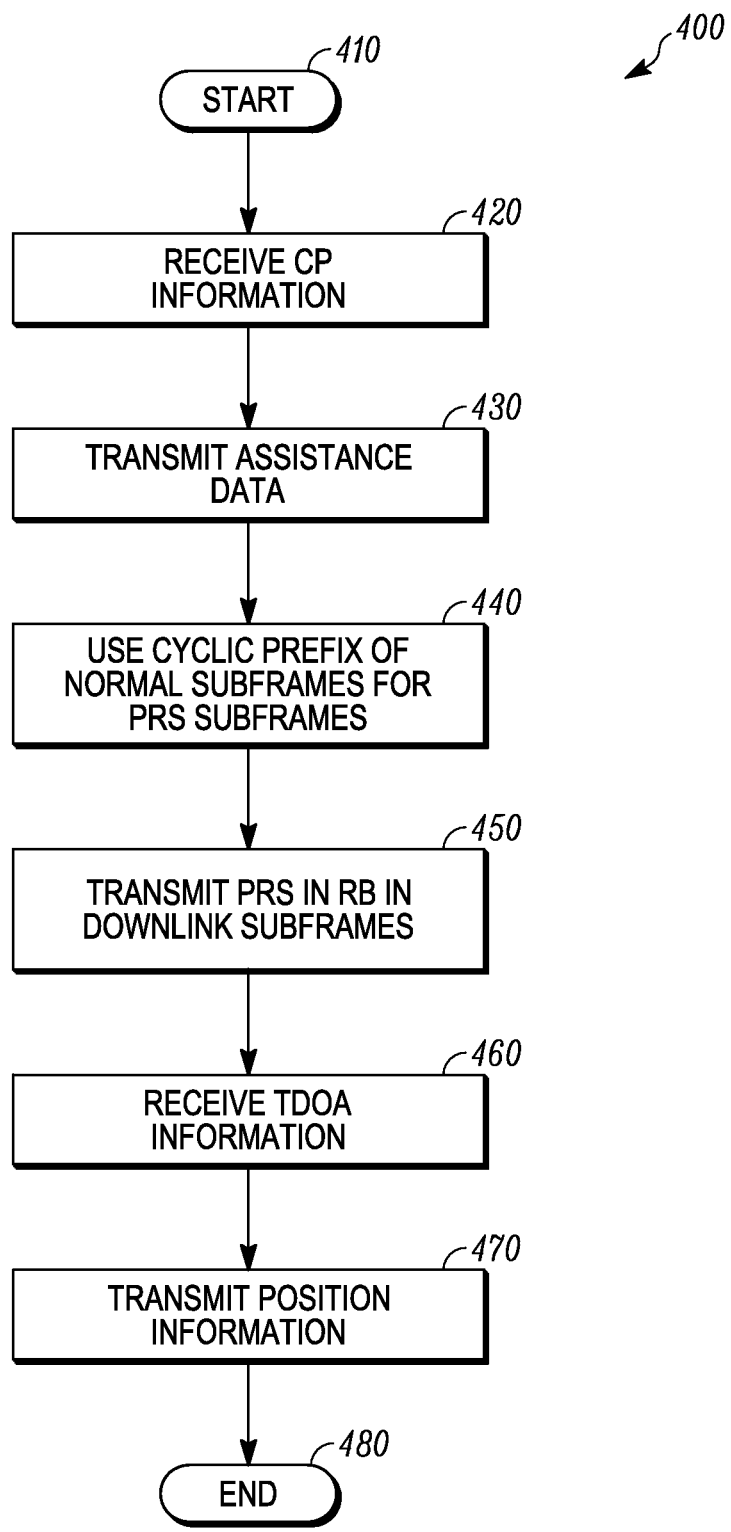
FIG. 4 is an example flowchart illustrating the operation of a network entity according to a possible embodiment.

FIG. 4 is an example flowchart 400 illustrating the operation of a base station, such as the base station 135, or other network entity according to a possible embodiment. Various blocks of the flowchart 400 can be used in combination with the flowchart 300. At 410, the flowchart begins. At 420, information can be received from a network entity. The received information can indicate whether to transmit normal cyclic prefix or extended cyclic prefix positioning reference signals. The information can be used with step 330 of flowchart 400 to configure subframes in the wireless communication network as positioning subframes based on the received information. At 430, assistance data regarding a neighbor cell can be transmitted. The assistance data can include cyclic prefix information for neighbor cells. At 440, a cyclic prefix of a first subframe can be used as the cyclic prefix for the positioning subframes if all of the positioning subframes are not multicast broadcast single frequency network subframes. For example, a same cyclic prefix for positioning reference signals can be generated as a cyclic prefix used for a first subframe for positioning reference signals if both normal and multicast broadcast single frequency network subframes are configured as positioning subframes within the cell. At 450, positioning reference signals can be transmitted only in resource blocks in downlink subframes configured for positioning reference signals transmission. At 460, time difference of arrival information can be received from a wireless device. The time difference of arrival information can be based on the positioning reference signals. At 470, information regarding a position of the wireless device can be transmitted based on the time difference of arrival information. At 480, the method can end.

According to some embodiments, all of the blocks of the flowchart 400 are not necessary. Additionally, the flowchart 400 or blocks of the flowchart 400 may be performed numerous times, such as iteratively. For example, the flowchart 400 may loop back from later blocks to earlier blocks. Furthermore, many of the blocks can be performed concurrently or in parallel processes. Functions of the system 100 described above can also be incorporated into the flowchart 400.

Figure 5:
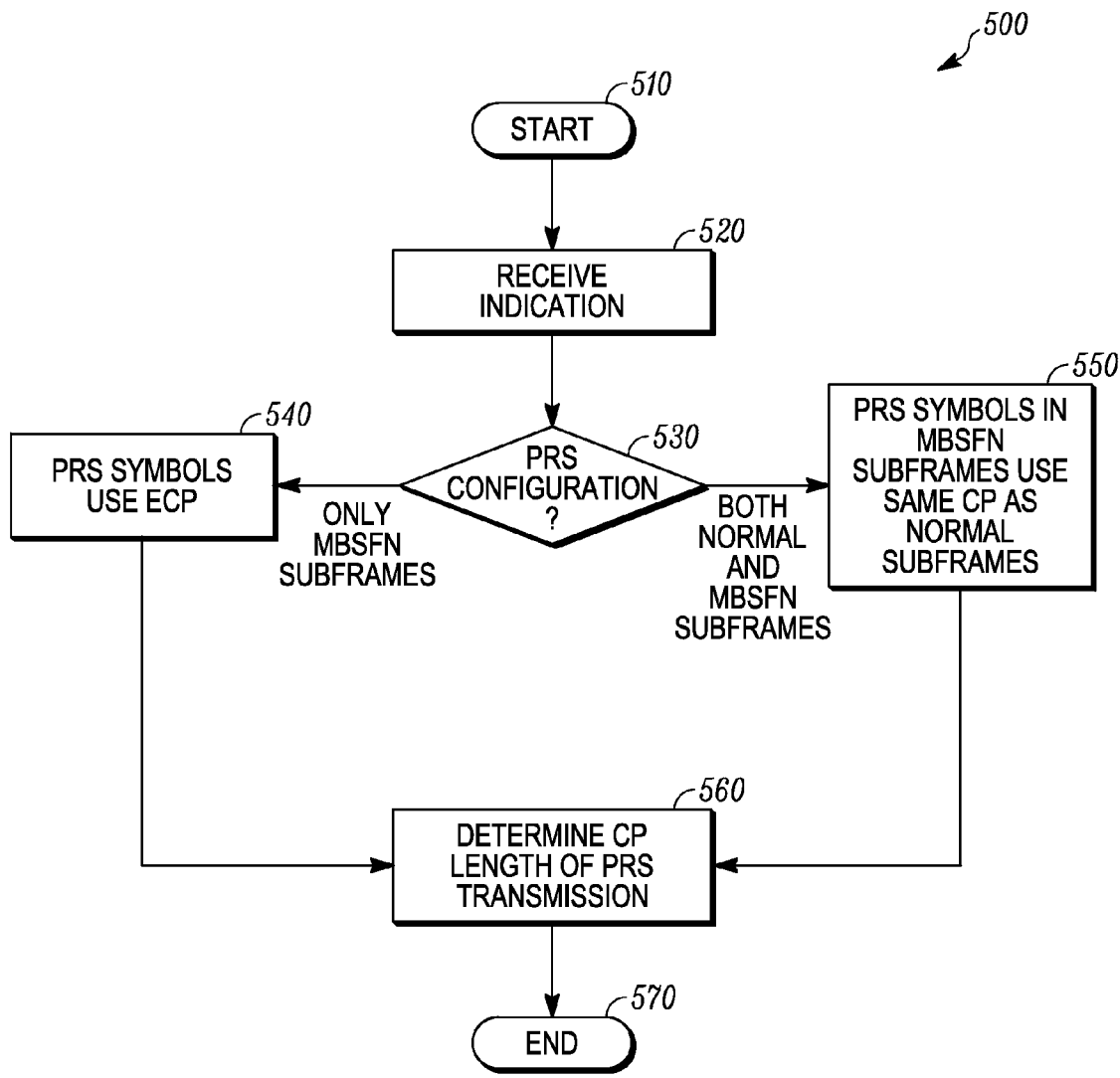
FIG. 5 is an example flowchart illustrating the operation of a wireless communication device according to a possible embodiment.

FIG. 5 is an example flowchart 500 illustrating the operation of the wireless communication device 200 according to a possible embodiment. At 510, the flowchart begins. At 520, an indication in assistance data can be received from a serving cell. The indication can correspond to a CP length of a PRS transmission for a neighbor cell. The indication corresponding to the CP length can be an implicit indication or an explicit indication. For example, the indication can be at least one bit signaled in long term evolution positioning protocol assistance data received from a serving cell. The assistance data can include at least one cyclic prefix length indicator bit if a cyclic prefix length of a neighbor cell is different from the cyclic prefix length of the reference cell and the assistance data can exclude the at least one cyclic prefix length indicator bit if a cyclic prefix length of a neighbor cell is the same as a cyclic prefix length of a reference cell. The reference cell may or may not be the serving cell. The assistance data can always include one bit indicating a cyclic prefix length for the reference cell.

At 530, the wireless communication device 200 can determine the configuration for PRS symbols within at least one PRS occasion. At 540, the wireless communication device 200 can determine that all PRS symbols within at least one PRS occasion use only extended CP when only MBSFN subframes are configured for PRS transmission. For example, the PRS occasion can comprise only MBSFN subframes.

At 550, the wireless communication device 200 can determine, as at least one alternate to determining that all PRS symbols within at least one PRS occasion use only extended CP, that PRS symbols in MBSFN subframes use a same CP length as that for normal subframes when both normal and MBSFN subframes are configured for PRS transmission. Block 550 can determine the CP length of PRS transmission by determining that the CP length of PRS transmission within one PRS occasion is the same CP length as that for normal subframes based on the indication in the assistance data and based on the determination that all PRS symbols within one PRS occasion use the same CP length as that for normal subframes. For example, the PRS occasion can comprise both normal and MBSFN subframes. In other words, PRS is transmitted in both normal and MBSFN subframes where one PRS occasion can have NPRS consecutive PRS subframes, where NPRS can be 1, 2, 4 or 6. Block 550 can indicate that the UE deduces the CP length of PRS in MBSFN subframes within a PRS occasion based on the CP length of the normal subframes, such as the CP length of the unicast symbols, such as PDCCH symbols in normal subframes. The CP length of PRS symbols in normal subframes can be equal to CP length of unicast symbols in normal subframes. This way, all PRS symbols within a PRS occasion can have the same CP length.

When the wireless communication device 200 knows that block 540 and block 550 hold under the respective conditions, just 1 bit of signaling can be sufficient to indicate the CP length of PRS in all subframes of a PRS occasion. For example, assistance information can indicate the time reuse pattern of the PRS subframes that includes the number of consecutive subframes configured (NPRS=1, 2, 4, 6) for PRS transmission in one PRS occasion, the periodicity of PRS occasions, such as 160 ms or 320 ms, and the radio frame in which the first PRS occasion is sent relative to the radio frame with SFN=0. This can be signaled in an information element, prsInfo, within the assistance data. In addition, the bandwidth of PRS transmission, which can be less than or equal to the downlink system bandwidth, is signaled.

As a further example, assistance data can include information regarding a number of consecutive positioning subframes, such as N number of subframes, where N can be 1, 2, 4, 6, or any other number of consecutive subframes. For example, the assistance data can include information regarding Physical Cell Identifiers (PCID's) of neighbors to look for, information regarding a number of consecutive positioning subframes, information regarding a periodicity of positioning subframes, information regarding a bandwidth allocated for positioning reference signals, information regarding a CP of the positioning subframes, and other information. The values of the symbols and their location in a resource block of a subframe can be a function of a PCID.

At 560, a CP length of PRS transmission within one PRS occasion can be determined based on the indication in the assistance data and based on the determination that all PRS symbols within one PRS occasion use the same CP length as that for normal subframes. The CP length of PRS transmission can be determined by determining the CP length of PRS transmission within one PRS occasion based on the indication in the assistance data and the determination that all PRS symbols within at least one PRS occasion use only extended CP. The CP length of PRS transmission can be determined by determining that the CP length of PRS transmission within one PRS occasion is extended CP based on the indication in the assistance data and the determination that all PRS symbols within at least one PRS occasion use only extended CP.

The determination steps can be performed at different times and in different sequences. For example, the method can determine whether all PRS symbols within at least one PRS occasion use only extended CP when only MBSFN subframes are configured for PRS transmission, can determine whether PRS symbols in MBSFN subframes use the same CP length as that for normal subframes when both normal and MBSFN subframes are configured for PRS transmission, and can then determine the CP length of PRS transmission within one PRS occasion based on the indication in the assistance data and based on whether all PRS symbols within one PRS occasion use the same CP length. At 570, the flowchart 500 can end.

According to some embodiments, all of the blocks of the flowchart 500 are not necessary. Additionally, the flowchart 500 or blocks of the flowchart 500 may be performed numerous times, such as iteratively. For example, the flowchart 500 may loop back from later blocks to earlier blocks. Furthermore, many of the blocks can be performed concurrently or in parallel processes. Functions of the system 100 described above can also be incorporated into the flowchart 500.

Figure 6:
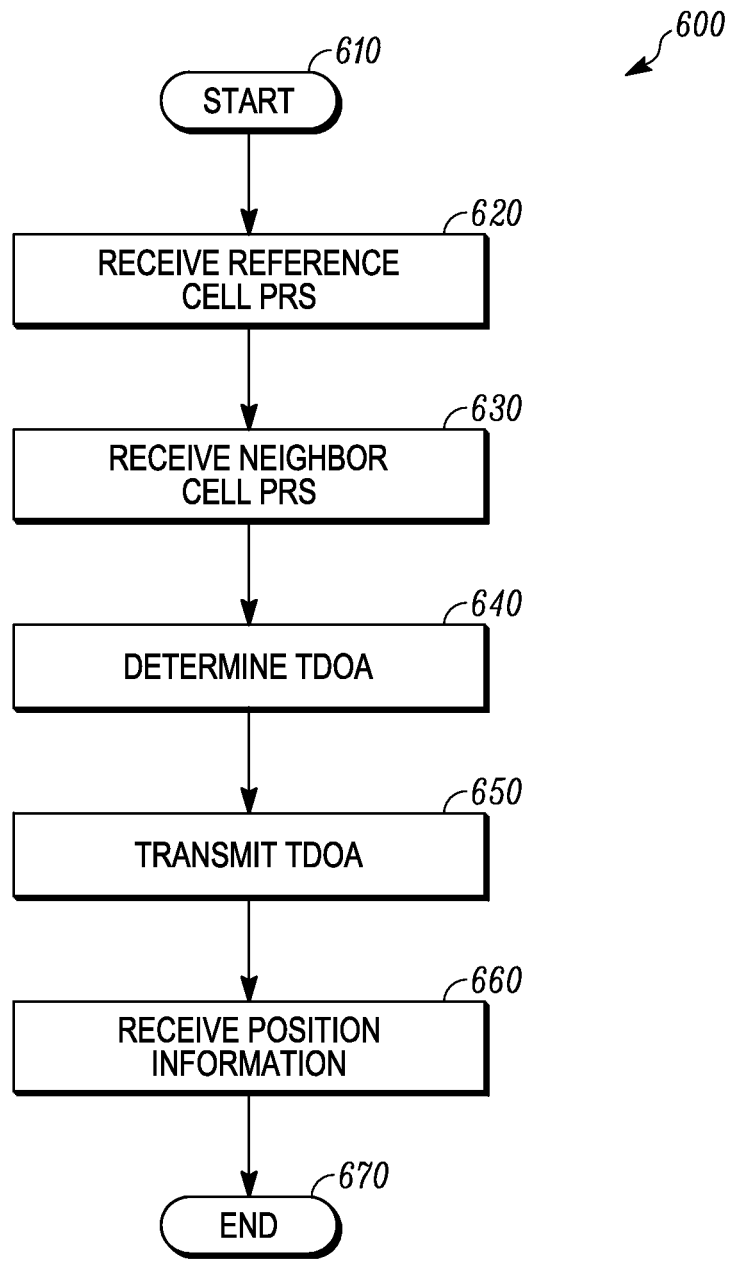
FIG. 6 is an example flowchart illustrating the operation of a wireless communication device according to a possible embodiment.

FIG. 6 is an example flowchart 600 illustrating the operation of the wireless communication device 200 according to a possible embodiment. Various blocks of the flowchart 600 can be used in combination with the flowchart 500. At 610, the flowchart begins. At 620, a reference cell transmission including reference cell positioning reference signal subframes can be received from a reference cell. At 630, a neighbor cell transmission including neighbor cell positioning reference signal subframes can be received from the neighbor cell. At 640, a time difference of arrival of the neighbor cell transmission can be determined relative to the reference cell transmission based on the received PRS subframes. At 650, the time difference of arrival can be transmitted to the serving cell. At 660, information regarding a position of the wireless communication device 200 can be received from the serving cell in response to transmitting the time difference of arrival to the serving cell.

The position of the wireless communication device 200 can be based on time difference of arrival of multiple neighbor cell transmissions relative to the reference cell. For example, an observed time difference of arrival of the neighbor cell positioning subframes can be determined by processing the reference cell positioning subframes and the neighbor cell positioning subframes. The observed time difference of arrival of the neighbor cell positioning subframes can be relative to the reference cell positioning subframes and is not necessarily based on an absolute time. The position of the wireless communication device can be estimated based on the observed time difference of arrival of the neighbor cell positioning subframes from multiple different neighbor cells relative to the reference cell positioning subframes. The observed time difference of arrival can be sent to a server and the server can determine the position of the user equipment based on the observed time difference of arrival and based on other information, such as based on other information about the cells including the location of the cells.

As a further example, a cross-correlation can be performed on a neighbor cell positioning subframe. The peak of the cross-correlation of the neighbor cell positioning subframe can be compared with a peak of a cross-correlation performed on a reference cell positioning subframe. The observed time difference of arrival can be determined based on a difference in time between the peak of the cross-correlation of the neighbor cell positioning subframe and the peak of the cross-correlation of the reference cell positioning subframe. At 670, the method can end.

According to some embodiments, all of the blocks of the flowchart 600 are not necessary. Additionally, the flowchart 600 or blocks of the flowchart 600 may be performed numerous times, such as iteratively. For example, the flowchart 600 may loop back from later blocks to earlier blocks. Furthermore, many of the blocks can be performed concurrently or in parallel processes. Functions of the system 100 described above can also be incorporated into the flowchart 600.

Figure 7:
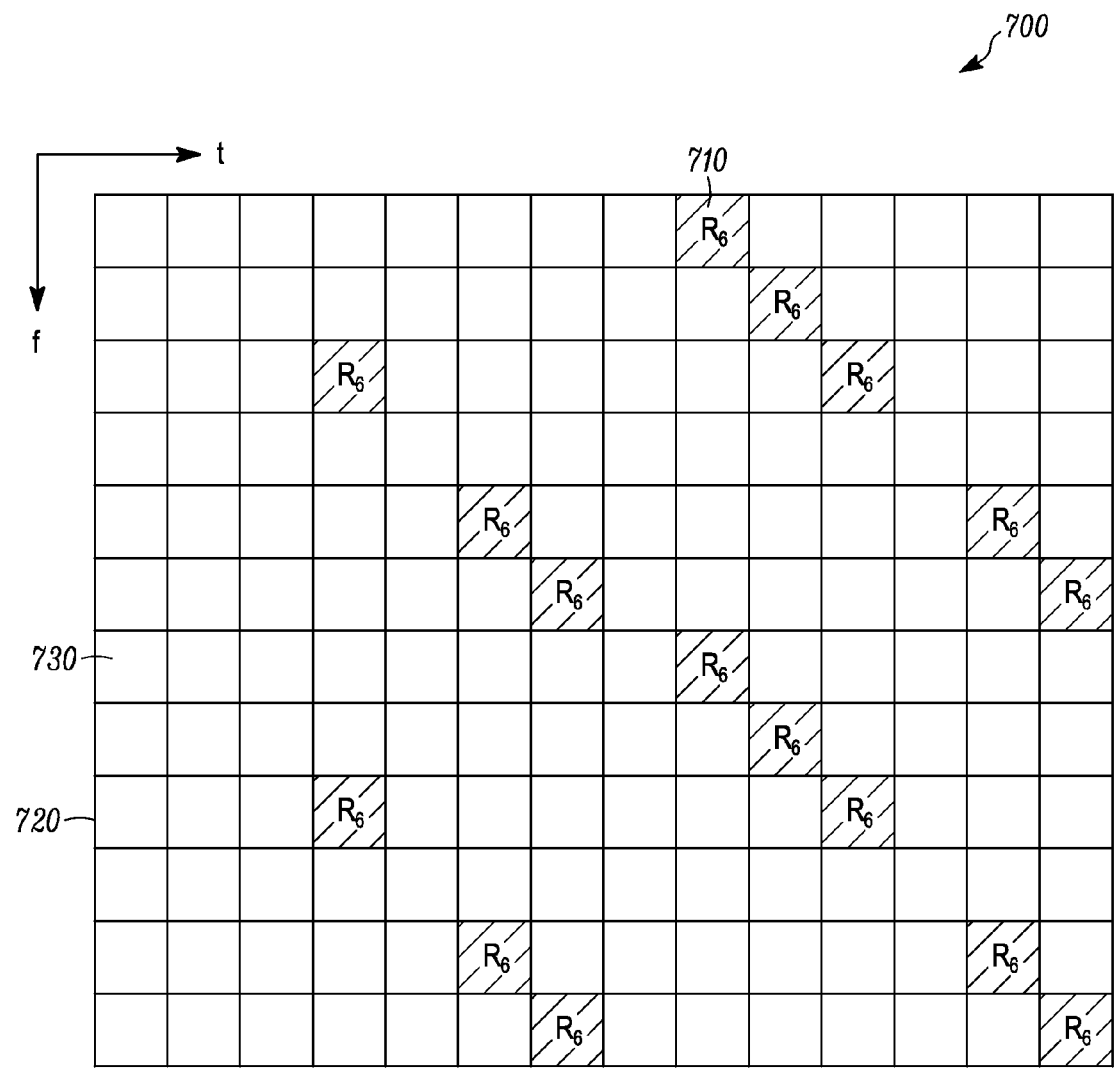
FIG. 7 is an example illustration of mapping of positioning reference signals using normal cyclic prefix in a downlink subframe.

FIG. 7 is an example illustration of mapping of positioning reference signals 710 using normal cyclic prefix in a downlink subframe 700. The subframe 700 can be transmitted by an eNB, such as the base station 135 or the base station 145 serving the cells 130 or 140, respectively. The subframe 700 can include a resource block 720 of twelve subcarriers along frequency axis f, each of which can be divided into fourteen time segments along time axis t. Each time segment on a particular subcarrier can include a resource element 730, which can contain a digitally modulated symbol, such as quadrature phase shift keying modulated symbol, 16 quadrature amplitude modulated symbol, or 64 quadrature amplitude modulated symbol. A set of resource elements 730 can spread across all the subcarriers during a particular segment or duration of time to form an Orthogonal Frequency Division Multiplexed (OFDM) symbol. A set of OFDM symbols can form the subframe 700. An OFDM symbol can contain a positioning reference signal 710 encoded as symbol into a resource elements 730. The positioning reference signal 710 is indicated as "$R_6$" as it may be transmitted using antenna port 6.

Figure 8:
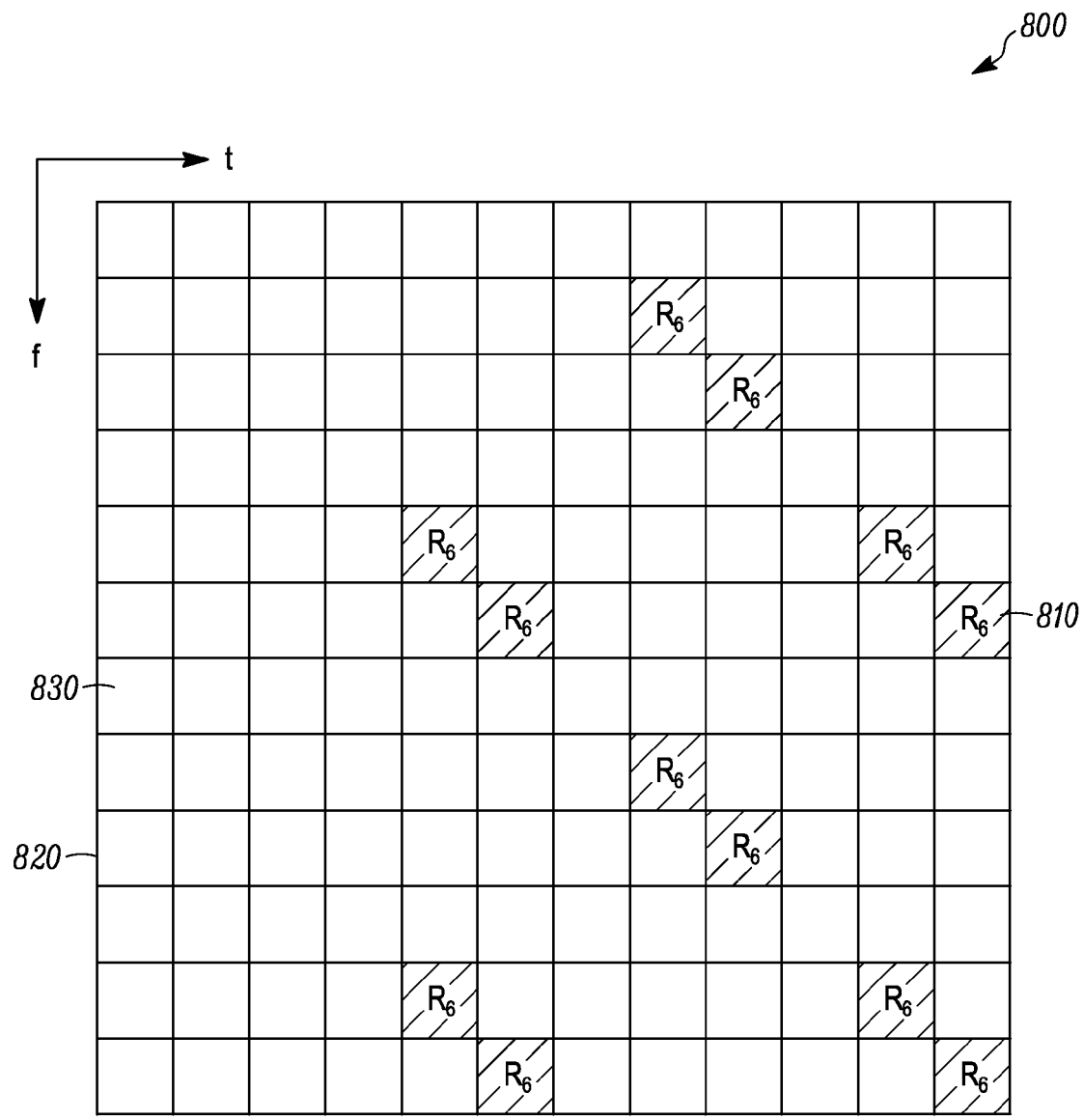
FIG. 8 is an example illustration of mapping of positioning reference signals using extended cyclic prefix in a downlink subframe.

FIG. 8 is an example illustration of mapping of positioning reference signals 810 using extended cyclic prefix in a downlink subframe 800. As with the subframe 700, the subframe 800 can be transmitted by an eNB, such as the base station 135 or the base station 145 serving the cells 130 or 140, respectively. The subframe 800 can include a resource block 820 of twelve subcarriers along frequency axis f, each of which can be divided into twelve time segments along time axis t. An OFDM symbol can contain a positioning reference signal 810 encoded as symbol into a resource elements 730. The length in time of the subframe 800 can be the same as the length of time of the subframe 700.

Embodiments can provide for base stations within a certain geographical area participating in OTDOA-based positioning support that can decide to transmit PRS on symbols of a pre-determined CP type, such as normal CP, extended CP, or any other CP, through network coordination when PRS are transmitted on MBSFN subframes. The chosen CP type can be indicated by a participating base station to a UE attached to it on a common broadcast channel or a user-specific channel. For example, a UE in such a coverage area can receive PRS on a given CP type, such as either the normal CP or extended CP, from all the base stations. This can preserve time-domain orthogonality between PRS subframes with non-overlapping resource element patterns and therefore, statistically preserve the low interference property of the PRS design. This can also allow the UE to process the signal to estimate OTDOA based on PRS transmission of the used CP length. Embodiments can use MBSFN subframes designated as positioning reference symbols to preserve the orthogonality of positioning reference signals in environments where different cells use different CP lengths for the normal subframe. Some embodiments can remove a requirement that the cyclic prefix length for the MBSFN subframe be tied to that of subframe #0, such as a normal subframe, when the MBSFN subframe is used as a positioning subframe. Some embodiments can require that all MBSFN subframes used as positioning subframes can be always normal cyclic prefix, can be always extended cyclic prefix, and/or can be either normal or extended CP, which in this case should be signaled. Other embodiments can provide for other variations. Some embodiments can signal cyclic prefix length of positioning reference signal transmissions in MBSFN subframes According to one example, a definition for position reference signal transmissions can indicate that positioning reference signals shall only be transmitted in resource blocks in downlink subframes configured for positioning reference signals transmission. If both normal and MBSFN subframes are configured as positioning subframes within a cell, the OFDM symbols in a MBSFN subframe configured for positioning reference signals transmission shall use the same cyclic prefix as used for subframe #0. If only MBSFN subframes are configured as positioning subframes within a cell, the OFDM symbols configured for positioning reference signals in these subframes shall use extended cyclic prefix length. Positioning reference signals can be transmitted on antenna port 6. Other definitions may be provided according to other embodiments provided above.

The methods of this disclosure may be implemented on a programmed processor. However, the operations of the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in a wireless communication network, the method comprising:
    configuring subframes in the wireless communication network as multicast broadcast single frequency network subframes;
    configuring subframes in the wireless communication network as positioning subframes including positioning reference signals;
    determining whether all of the positioning subframes are multicast broadcast single frequency network subframes; and
    generating extended cyclic prefix positioning reference signals for all of the positioning subframes if all of the positioning subframes are multicast broadcast single frequency network subframes.

2. The method according to claim 1, further comprising transmitting assistance data regarding a neighbor cell, the assistance data including cyclic prefix information for neighbor cells.

3. The method according to claim 1, further comprising using a cyclic prefix of a first subframe as the cyclic prefix for the positioning subframes if all of the positioning subframes are not multicast broadcast single frequency network subframes.

4. The method according to claim 1, wherein configuring subframes in the wireless communication network as positioning subframes comprises configuring a plurality of consecutive subframes in the wireless communication network as positioning subframes.

5. The method according to claim 1,
    wherein determining whether all of the positioning subframes are multicast broadcast single frequency network subframes comprises determining whether only multicast broadcast single frequency network subframes are configured as positioning subframes within the cell, and
    wherein generating comprises generating extended cyclic prefix positioning reference signals for all of the positioning subframes if only multicast broadcast single frequency network subframes are configured as positioning subframes within the cell.

6. The method according to claim 5, further comprising generating a same cyclic prefix for positioning reference signals as a cyclic prefix used for a first subframe for positioning reference signals if both normal and multicast broadcast single frequency network subframes are configured as positioning subframes within the cell.

7. The method according to claim 1, further comprising:
receiving time difference of arrival information from a wireless device, the time difference of arrival information based on the positioning reference signals; and
transmitting information regarding a position of the wireless device based on the time difference of arrival information.

8. A method in a user equipment in a wireless communication network, the user equipment having a transceiver, the method comprising:
receiving an indication in assistance data received from a serving cell, the indication corresponding to a cyclic prefix length of a positioning reference signal transmission for a second cell;
determining that all positioning reference signal symbols within at least one positioning reference signal occasion use only extended cyclic prefix when only multicast broadcast single frequency network subframes are configured for positioning reference signal transmission from the second cell;
determining, as at least one alternate to determining that all positioning reference signal symbols within at least one positioning reference signal occasion use only extended cyclic prefix, that positioning reference signal symbols in multicast broadcast single frequency network subframes use a same cyclic prefix length as that for normal subframes when both normal and multicast broadcast single frequency network subframes are configured for positioning reference signal transmission from the second cell; and
determining a cyclic prefix length of a positioning reference signal transmission from the second cell within one positioning reference signal occasion based on the indication in the assistance data and based on the determination that all positioning reference signal symbols within one PRS occasion use the same cyclic prefix length as that for normal subframes.

9. The method according to claim 8, wherein the second cell is a reference cell.

10. The method according to claim 8, wherein the second cell is a neighbor cell.

11. The method according to claim 8, wherein determining the cyclic prefix length of positioning reference signal transmission comprises determining that the cyclic prefix length of positioning reference signal transmission within one positioning reference signal occasion is the same cyclic prefix length as that for normal subframes based on the indication in the assistance data and based on the determination that all positioning reference signal symbols within one positioning reference signal occasion use the same cyclic prefix length as that for normal subframes.

12. The method according to claim 8, wherein determining the cyclic prefix length of positioning reference signal transmission comprises determining the cyclic prefix length of positioning reference signal transmission within one positioning reference signal occasion based on the indication in the assistance data and the determination that all positioning reference signal symbols within at least one positioning reference signal occasion use only extended cyclic prefix.

13. The method according to claim 12, wherein determining the cyclic prefix length of positioning reference signal transmission comprises determining that the cyclic prefix length of positioning reference signal transmission within one positioning reference signal occasion is extended cyclic prefix based on the indication in the assistance data and the determination that all positioning reference signal symbols within at least one positioning reference signal occasion use only extended cyclic prefix.

14. The method according to claim 8, wherein the indication corresponding to the cyclic prefix length comprises one of an implicit indication and an explicit indication.

15. The method according to claim 8, wherein the indication comprises at least one bit signaled in long term evolution positioning protocol assistance data received from a serving cell, where the assistance data includes at least one cyclic prefix length indicator bit if a cyclic prefix length of a neighbor cell is different from the cyclic prefix length of the reference cell and the assistance data excludes the at least one cyclic prefix length indicator bit if a cyclic prefix length of a neighbor cell is the same as a cyclic prefix length of a reference cell.

16. The method according to claim 8, further comprising:
receiving a reference cell transmission including reference cell positioning reference signal subframes from the reference cell;
receiving a neighbor cell transmission including neighbor cell positioning reference signal subframes from the neighbor cell;
determining a time difference of arrival of the neighbor cell transmission relative to the reference cell transmission based on the received positioning reference signal subframes; and
transmitting the time difference of arrival to the serving cell.

17. The method according to claim 16, further comprising receiving information regarding a position of the user equipment from the serving cell in response to transmitting the time difference of arrival to the serving cell.

18. A wireless communication device comprising:
a transceiver configured to transmit and receive signals over a wireless communication network, the transceiver also configured to receive a positioning reference signal indication in assistance data received from a serving cell, the positioning reference signal indication corresponding to a cyclic prefix length of a positioning reference signal transmission for a neighbor cell;
a controller coupled to the transceiver, the controller configured to control operations of the wireless communication device; and
a positioning reference signal cyclic prefix determination module coupled to the controller, the positioning reference signal cyclic prefix determination module configured to determine whether all positioning reference signal symbols within at least one positioning reference signal occasion use only extended cyclic prefix when only multicast broadcast single frequency network subframes are configured for positioning reference signal transmission, configured to determine whether all positioning reference signal symbols within at least one positioning reference signal occasion use only extended cyclic prefix, configured to determine whether positioning reference signal symbols in multicast broadcast single frequency network subframes use the same cyclic prefix length as that for normal subframes when both normal and multicast broadcast single frequency network subframes are configured for positioning reference signal transmission, and configured to determine a cyclic prefix length of positioning reference signal transmission within one positioning reference signal occasion is extended cyclic prefix based on the indication in the assistance data and based on the determination that all positioning reference signal symbols within at least one positioning reference signal occasion use only extended cyclic prefix when only multicast broadcast single frequency network subframes are configured for positioning reference signal transmission.

19. The wireless communication device according to claim 18, wherein the positioning reference signal indication comprises at least one bit signaled in long term evolution positioning protocol assistance data received from a serving cell, where the assistance data includes at least one cyclic prefix length indicator bit if a cyclic prefix length of a neighbor cell is different from the cyclic prefix length of the reference cell and the assistance data excludes the at least one cyclic prefix length indicator bit if a cyclic prefix length of a neighbor cell is the same as a cyclic prefix length of a reference cell.

20. The wireless communication device according to claim 18,
wherein the transceiver is configured to receive a reference cell transmission including reference cell positioning reference signal subframes from the reference cell and configured to receive a neighbor cell transmission including neighbor cell positioning reference signal subframes from the neighbor cell,
wherein the controller is configured to determine a time difference of arrival of the neighbor cell transmission relative to the reference cell transmission based on the received positioning reference signal subframes, and
wherein the transceiver is configured to transmit the time difference of arrival to the serving cell.

* * * * *